United States Patent
Chai et al.

(10) Patent No.: US 9,873,461 B2
(45) Date of Patent: Jan. 23, 2018

(54) PLASTIC FENDER FOR COPING WITH THERMAL DEFORMATION

(71) Applicant: Hyundai Motor Company, Seoul (KR)

(72) Inventors: Suk-Jun Chai, Gyeonggi-do (KR); Ji-Yong Shin, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 1 day.

(21) Appl. No.: 15/090,276

(22) Filed: Apr. 4, 2016

(65) Prior Publication Data

US 2017/0158248 A1    Jun. 8, 2017

(30) Foreign Application Priority Data

Dec. 4, 2015    (KR) .................. 10-2015-0172368

(51) Int. Cl.
  *B62D 25/16*    (2006.01)
  *B62D 25/18*    (2006.01)
  *B62D 29/04*    (2006.01)

(52) U.S. Cl.
  CPC ......... *B62D 25/161* (2013.01); *B62D 25/163* (2013.01); *B62D 25/18* (2013.01); *B62D 29/043* (2013.01)

(58) Field of Classification Search
  CPC ..... B62D 25/161; B62D 29/043; B62D 25/18
  See application file for complete search history.

(56) References Cited

U.S. PATENT DOCUMENTS

| 6,409,255 B2 * | 6/2002 | Tilsner ................. | B62D 25/082 296/187.09 |
| 7,523,980 B2 * | 4/2009 | Okamoto ............. | B62D 25/161 296/193.05 |
| 2005/0099035 A1 | 5/2005 | Fries et al. | |
| 2011/0037293 A1 * | 2/2011 | Kralevich ............... | B60R 21/34 296/198 |

FOREIGN PATENT DOCUMENTS

| KR | 1997-0003553 | 4/1997 |
| KR | 10-2005-0096519 A | 10/2005 |

\* cited by examiner

*Primary Examiner* — D Glenn Dayoan
*Assistant Examiner* — Melissa A Black
(74) *Attorney, Agent, or Firm* — Mintz Levin Cohn Ferris Glovsky and Popeo, P.C.; Peter F. Corless (57) ABSTRACT

A plastic fender is provided for coping with thermal deformation. Additionally, an apparatus is provided which makes an effect of allowing the plastic fender to move to cope with thermal deformation, by integrally forming a bellows shape with a mounting portion of the plastic fender. The plastic fender includes a hood line portion, a bumper line portion, and a door line portion. Additionally, mounting portions are formed along an edge of each of the hood line portion, the bumper line portion, and the door line portion, respectively. The plastic fender includes a bellows-shaped portion that is formed on the mounting portions and is moveable to cope with the thermal deformation.

5 Claims, 10 Drawing Sheets

FIG. 1

RELATED ART

FIG. 2

RELATED ART

FIG. 3

RELATED ART

FIG. 4

RELATED ART

FIG. 5

RELATED ART

PLASTIC FENDER FOR COPING WITH THERMAL DEFORMATION

CROSS-REFERENCE TO RELATED APPLICATIONS

This application claims priority under 35 U.S.C. §119 to Korean Patent Application No. 10-2015-0172368, filed on Dec. 4, 2015, in the Korean Intellectual Property Office, the disclosure of which is incorporated herein by reference in its entirety.

BACKGROUND

1. Field of the Invention

The present invention relates to a plastic fender for coping with thermal deformation, and to an apparatus which allows the plastic fender to move to cope with thermal deformation, by integrally forming a bellows shape with a mounting portion of the plastic fender.

2. Description of the Related Art

Recently, as environmental concerns and issues have increased, technologies for preventing environmental pollution are being researched. As a way to solve the environmental problems, vehicle manufacturers have proposed solutions for increasing fuel efficiency by maximizing efficiency of an engine, and solutions for increasing fuel efficiency by reducing weights of the automobiles.

Methods of increasing fuel efficiency by reducing weight of the vehicle include a method of increasing rigidity or durability of the existing alloy steel used as a material for the vehicle despite the reduction in weight of the alloy steel, and a method of substituting the alloy steel, which is used as a material for the vehicle, with a plastic material which is lighter in weight than the alloy steel and easy to ensure rigidity. The plastic material in the related art has an advantage over the alloy steel in that the plastic material is not corroded, but has problems in that colors of the plastic material are altered due to light, strength of the plastic material deteriorates, and the plastic material has lower rigidity than the existing alloy steel.

A fender for a vehicle represents what is referred to as a mudguard for an automobile, and refers to a vehicle component that covers a tire, that is, generally refers to a part where a side of a vehicle body extends in a flatwise manner. The fender for a vehicle is typically made of a steel material, but this causes an increase in weight of the vehicle, and the fender made of a steel material may be depressed or deformed upon impact which may be difficult to restore. Therefore, recently, a method of manufacturing the fender for a vehicle using a plastic material has been proposed to increase fuel efficiency by reducing the weight of the vehicle and more easily restore the fender shape damaged or deformed by impact.

A fender made of a plastic material as described above may reduce the weight thereof by about more than 40% than the fender made of a steel material, and may be manufactured to have various designs due to formability thereof. However, a greater thermal deformation occurs in the plastic material than in the steel material. In general, there are various methods of painting the vehicle, but the vehicle body line assembling capable of reducing manufacturing costs by using color matching of the vehicle and the existing facility, that is, a method of performing heat treatment and painting after coupling of the plastic fender to the vehicle body is advantageous.

However, when heat treatment is performed on the vehicle body, the fender for a vehicle made of a plastic material is damaged due to thermal deformation caused by a difference in coefficient of thermal expansion between the steel material and the plastic material. Various painting methods for solving the problem have been presented, but such methods incur additional costs and of the vehicle are not matched or inconsistent. In addition, a separate structure of a mounting portion of the plastic fender in the related art fixes the plastic fender to the vehicle body using a mounting method that has a separate structure, that is, using a sliding fixture, and as a result, there are problems in terms of time and costs since a separate sliding fixture is required to be manufactured, and the sliding fixture requires assembly through a separate manufacturing process.

SUMMARY

The present invention provides a plastic fender which prevents damage caused by thermal deformation by coping with thermal deformation occurring in a heat treatment process for a vehicle, reduces manufacturing costs by reducing the number of components additionally adopted, increases fuel efficiency by reducing weight of the vehicle, and prevents environmental pollution by reducing carbon dioxide through an increase in fuel efficiency. Technical problems to be solved by the present invention are not limited to the aforementioned technical problem, and other technical problems, which are not mentioned above, may be clearly understood from the following descriptions by those skilled in the art to which the present invention pertains.

An exemplary embodiment of the present invention provides a plastic fender for coping with thermal deformation, the plastic fender may include a hood line portion (e.g., a hood alignment section), a bumper line portion (e.g., a bumper alignment section), and a door line portion (e.g., a door alignment section) and having mounting portions formed along an edge thereof, respectively, in which the plastic fender may include a fixture formed on the mounting portion and moveable to cope with thermal deformation.

In the present invention, the plastic fender may be made of a thermoplastic resin. In addition, one or more fixtures may be included in the mounting portions of the hood line portion, the bumper line portion, and the door line portion. The fixture may include a fastening aperture fastened to a vehicle body by a fastener (e.g., a bolt or the like). The fixture may be formed integrally with the plastic fender. In addition, the fastening aperture may be positioned at a center of the fixture, and a bellows-shaped portion may be formed to connect the mounting portion and the fastening aperture. In the present invention, the bellows-shaped portion may have a rhombic shape.

The plastic fender for coping with thermal deformation according to the present invention may prevent damage caused by thermal deformation by coping with thermal deformation occurring in a heat treatment process for a vehicle, reduce manufacturing costs by reducing the number of components additionally adopted, increase fuel efficiency by reducing weight of the vehicle, and prevent environmental pollution by reducing carbon dioxide through an increase in fuel efficiency.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings. Terms or words used in the specification and the claims should not be interpreted as a general and dictionary meaning and should be interpreted as a meaning and a concept which conform to the technical spirit of the present invention based on a principle that an inventor can appropriately define a concept of a term to describe an invention by the best method. Therefore, the exemplary embodiments disclosed in the present specification and the configurations illustrated in the drawings are merely exemplary embodiments of the present invention and do not fully represent the technical spirit of the present invention. Accordingly, it should be appreciated that various equivalents and modified examples capable of substituting the exemplary embodiments at the time of filing the present application may be made.

Figure 1:
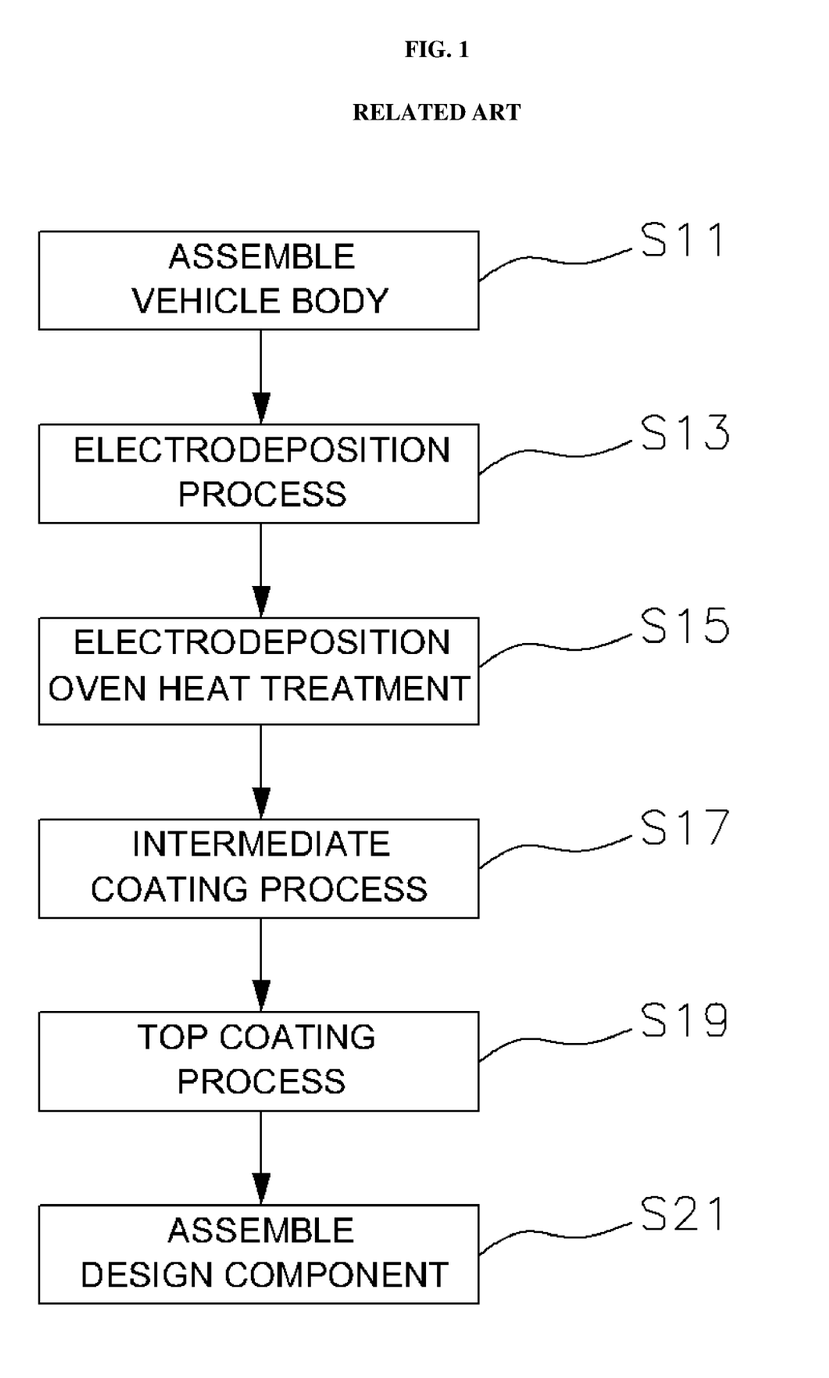
FIG. 1 is a flowchart illustrating typical processes for assembling and painting a vehicle according to the related art.

In one aspect, the present invention relates to a plastic fender for coping with thermal deformation by a bellows-shaped portion of a one-piece structure of a mounting portion of a plastic fender. FIG. 1 is a flowchart illustrating typical processes for assembling and painting a vehicle according to the related art. An electrodeposition process step S13, in which the vehicle is immersed in a space that stores paint, is performed after a vehicle body assembling process step S11 is performed on the vehicle. Thereafter, the vehicle body, which has been subjected to the electrodeposition process, is placed into an oven, and an electrodeposition oven heat treatment step S15, which dries the vehicle at a temperature of about 180 to 200° C., is performed. Thereafter, an intermediate coating process step S17 and a top coating process step S19 are performed on the vehicle body which has been subjected to the electrodeposition oven heat treatment, and then a design component assembling step S21 is performed.

The vehicle body is typically made of a steel material, but the fender according to the exemplary embodiment of present invention is made of a plastic material, and thus has a different coefficient of thermal expansion from the steel material. Therefore, when the fender is heated from a room temperature to a predetermined high temperature, there is a difference in degree of thermal expansion between the steel material and the plastic material, and as a result, the plastic material is damaged, and a painting surface may become uneven. Therefore, problems vary in accordance with a point of time at which the vehicle body made of a steel material and the fender made of a plastic material are coupled.

Typically, the process of coupling the plastic fender to the vehicle body made of a steel material may be classified into a vehicle body line assembling (on line) process, a painting line assembling (in line) process, and a design line assembling (off line) process, in accordance with a point of time at which the plastic fender is coupled to the vehicle body made of a steel material.

More specifically, the design line assembling (on line) process refers to a process of assembling the plastic fender between the top coating process step S19 and the design component assembling step S21. The process of assembling the plastic fender through the design line assembling process is advantageous for ensuring a gap and a level difference which are required for the vehicle, it may be possible to ensure impact-resistance and rigidity since no denaturation due to the heat treatment occurs, and a price of the plastic material applied to the plastic fender may be substantially low. However, since the vehicle body made of a steel material and the plastic fender need to be separately painted, it may be difficult to match (e.g. correlate) colors, and there is a disadvantage in that a process and a facility for mounting the plastic fender to the vehicle body are required to be provided separately.

The painting line assembling (in line) process refers to a process of assembling the plastic fender between the electrodeposition oven heat treatment step S15 and the intermediate coating process step S17. When the plastic fender is assembled through the painting line assembling process, the painting process is performed after assembling the plastic fender, such that it may be easier to match colors, and the assembling of the plastic fender is performed after the electrodeposition oven heat treatment step S15, and thus, minimal thermal deformation may occur. However, a process of mounting the plastic fender to the vehicle body is additionally performed, thus requiring a separate facility.

The painting line assembling (in line) process refers to a process of assembling the plastic fender between the vehicle body assembling step S11 and the electrodeposition process step S13. When the plastic fender is assembled through the vehicle body line assembling process, the vehicle body and the plastic fender are painted simultaneously, and thus the matching of the colors may be easier, and it may be possible to minimize investment costs since the existing mounting facility may be used. However, the electrodeposition oven heat treatment step needs to be performed, and as a result, a material strong against thermal deformation is used, thus causing costs required for the plastic material applied to the plastic fender to increase. However, it may be possible to minimize investment costs since a separate mounting facility is not provided, and the vehicle body and the plastic fender are painted simultaneously, thus improving color matching, and as a result, the plastic fender may be assembled and painted through the vehicle body line assembling process.

Figure 2:
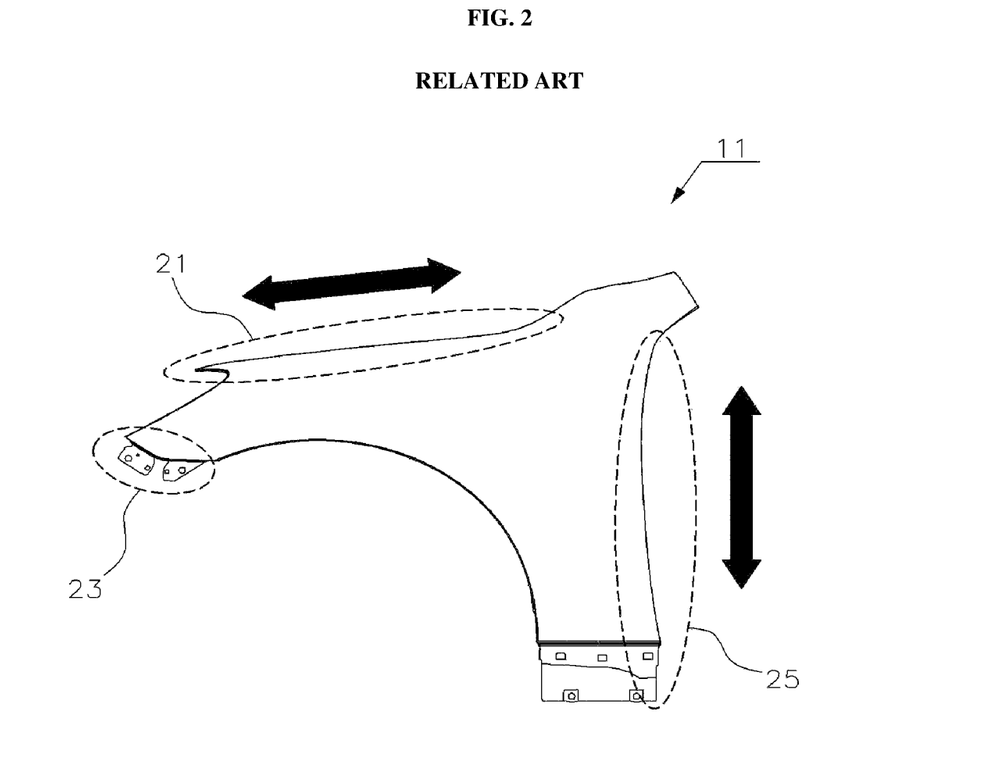
FIG. 2 is an exemplified view illustrating thermal deformation of a plastic fender during a heat treatment process according to the related art.

When the plastic fender is coupled to the vehicle body made of a steel material by bolts through the vehicle body line assembling process, the steel material and the plastic material may be thermally deformed differently since the steel material and the plastic material have different coefficients of thermal expansion. FIG. 2 is an exemplified view illustrating thermal deformation of the plastic fender during the heat treatment process according to the related art. As illustrated in FIG. 2, the plastic fender is thermally deformed, and thus expands in directions of arrows in FIG. 2. Therefore, the plastic material has a relatively greater degree of thermal deformation than the steel material, and thus the vehicle body made of a steel material is deformed thermally less than the plastic fender made of a plastic material, and as a result, the plastic fender may be damaged.

In the related art, as a solution to this problem, in the case of a plastic fender 11 assembled through the vehicle body line assembling (on line) process, a hood line portion 21 of the plastic fender, a bumper line portion 23 of the plastic fender, and a door line portion 25 of the plastic fender are partially fastened using a separate structure, that is, a sliding fixture 15 which is a separate structure of a mounting portion of the plastic fender. Since properties of the plastic material, the plastic fender 11 is more greatly thermally deformed than the steel material in the electrodeposition oven heat treatment step S15, and particularly, an end portion of the plastic fender is vulnerable to thermal deformation as illustrated in FIG. 2.

Figure 3:
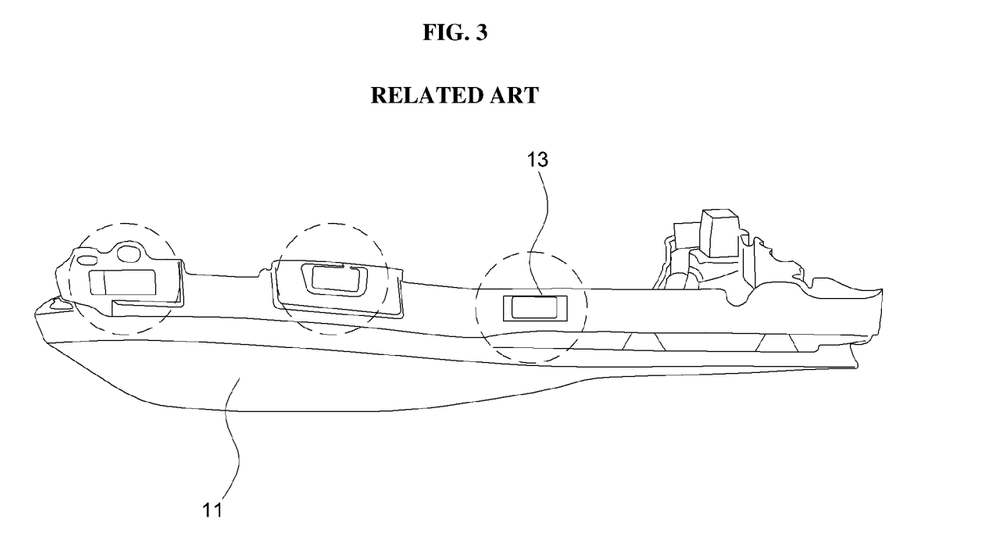
FIG. 3 is a picture illustrating quadrangular holes of a separate structure of a mounting portion of a plastic fender according to the related art.
Figure 4:
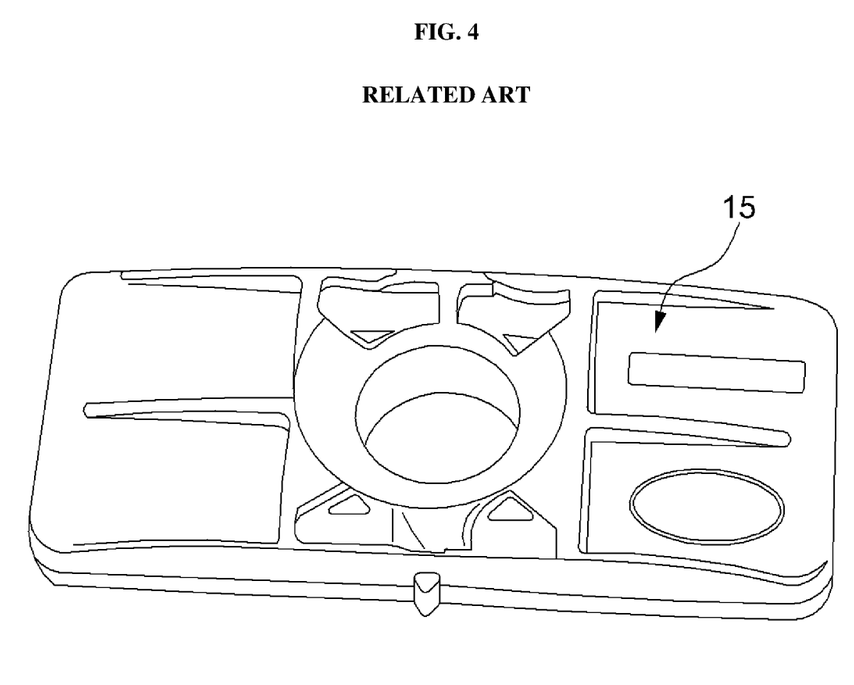
FIG. 4 is a configuration diagram of a sliding fixture according to the related art.

Therefore, permanent deformation of a surface portion may occur during a process in which the plastic fender 11 is restored by being cooled after the electrodeposition oven heat treatment step S15, and as a result, the sliding fixture 15 is applied to prevent the permanent deformation. FIG. 3 is a view illustrating quadrangular apertures 13 of a separate structure of a mounting portion of the plastic fender 11 according to the related art, and FIG. 4 is a configuration diagram of the sliding fixture 15 according to the related art. In the related art, to solve the aforementioned problems, the quadrangular apertures 13 as illustrated in FIG. 3 are formed in portions of the plastic fender 11 which are thermally deformed, and the sliding fixture 15 as illustrated in FIG. 4 is separately manufactured and coupled to the plastic fender 11.

Figure 5:
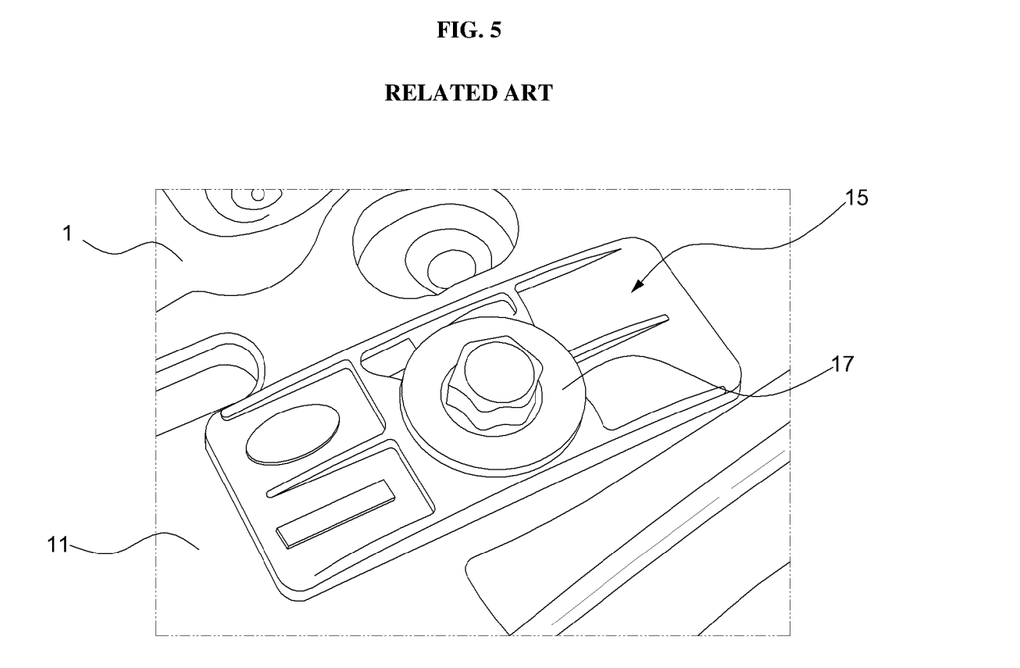
FIG. 5 is an exemplified view illustrating a state in which a vehicle body, a plastic fender, a sliding fixture, and a bolt according to the related art are coupled.

FIG. 5 is an exemplified view illustrating a state in which a vehicle body 1, the plastic fender 11, the sliding fixture 15, and a bolt 17 according to the related art are coupled. As illustrated in FIG. 5, when the vehicle body 1, the plastic fender 11, the sliding fixture 15, and the bolt 17 according to the related art are coupled and then heated in the electrodeposition oven heat treatment step S15, the plastic fender 11 is thermally deformed due to a difference in thermal deformation between the vehicle body 1 made of a steel material and the plastic fender 11, and in this case, a portion fastened by the bolt 17 is fixed. More specifically, the bolt 17, the sliding fixture 15, and the vehicle body 1 are fixed, but the plastic fender 11 is thermally deformed in the electrodeposition oven heat treatment step S15 along an edge of the sliding fixture 15 as a guide line, and the plastic fender 11 is restored back to an original shape after passing through the oven. In addition, the sliding fixture 15 is fitted into the quadrangular aperture 13 of the plastic fender 11, and slides only in one direction in which the plastic fender 11 is thermally deformed, based on the quadrangular aperture 13.

However, in the related art, material costs are increased since the sliding fixture 15 requires separate formation, and time required to assemble the sliding fixture 15 to the quadrangular aperture 13 of the plastic fender 11 is substantial since the sliding fixture 15 to the quadrangular aperture 13 of the plastic fender 11 is assembled separately. In addition, the sliding fixture 15 copes with thermal deformation only in one direction while sliding only in one direction, and as a result, it may be impossible to cope with thermal deformation that occurs in various directions.

The present invention has been made in an effort to solve the aforementioned problems, and provides a plastic fender 101 for a vehicle for coping with thermal deformation, the plastic fender may include the hood line portion 21 (e.g., a hood alignment section), the bumper line portion 23 (e.g., a bumper alignment section), and the door line portion 25 (e.g., a door alignment section) and having mounting portions formed along an edge thereof, respectively. The plastic fender 101 may include fixtures 110 formed on the mounting portion and moveable to cope with thermal deformation.

Furthermore, the plastic fender 101 may be made of a thermoplastic resin, and may include one or more fixtures 110 disposed at the mounting portions of the hood line portion 21, the bumper line portion 23, and the door line portion 25. In addition, the fixture 110 may include a fastening aperture fastened to the vehicle body by a fastener, and the fastener may be a bolt 115 or another similar type of fastening device. Furthermore, the fixture 110 may be formed integrally with the plastic fender 101, the fastening aperture may be positioned at a center of the fixture 110, and a bellows-shaped portion 113 may be formed to connect the mounting portion and the fastening aperture. Moreover, the bellows-shaped portion 113 may have a rhombic shape.

Figure 6:
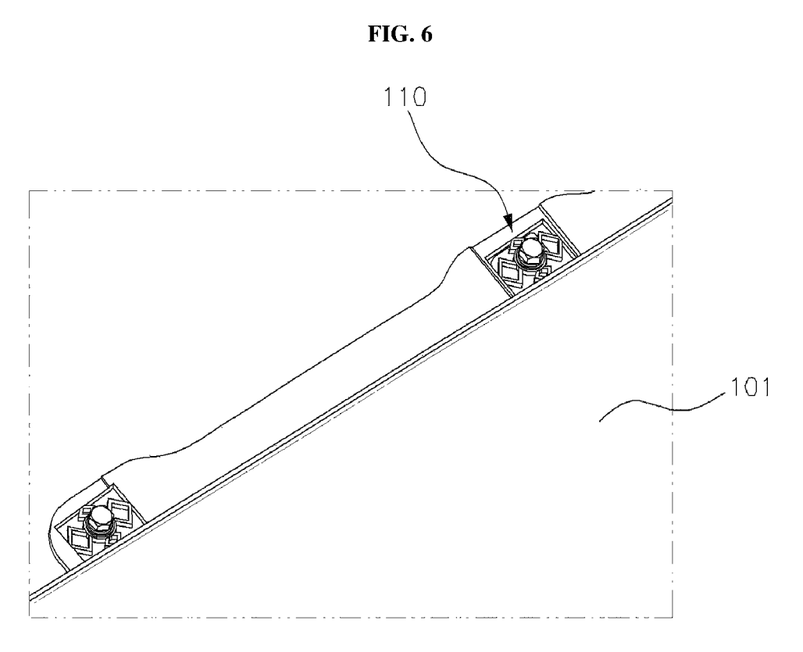
FIG. 6 is a configuration diagram of a one-piece structure of a mounting portion of a plastic fender according to an exemplary embodiment of the present invention.

When more specifically describing the present invention, FIG. 6 is a configuration diagram of a one-piece structure of the mounting portion of the plastic fender according to the exemplary embodiment of the present invention. In the plastic fender 101 which has the one-piece structure of the mounting portion of the plastic fender and copes with thermal deformation, the one-piece fixture 110 of the mounting portion of the plastic fender may include a quadrangular aperture 111 of the one-piece structure of the mounting portion of the plastic fender. However, the quadrangular aperture 111 of the one-piece structure of the mounting portion of the plastic fender may be changed to various shapes based on the vehicle body or the plastic fender to which the quadrangular aperture 111 is applied.

In the quadrangular aperture 111 of the one-piece structure of the mounting portion of the plastic fender, an aperture to be fastened to the vehicle body 1 by the bolt 115 may be applied. The aperture to be fastened to the vehicle body 1 by the bolt may be positioned at about a center of the quadrangular aperture 111 of the one-piece structure of the mounting portion of the plastic fender. Furthermore, as illustrated in FIG. 6, the bellows-shaped portion 113 may be positioned between the quadrangular aperture 111 and the aperture for fastening the bolt. The bellows-shaped portion 113 may be manufactured in various shapes based on the plastic fender 101 to which the bellows-shaped portion 113 is applied, and the bellows-shaped portion 113 may have a rhombic shape. The quadrangular aperture 111, the aperture for fastening the bolt 115, and the bellows-shaped portion 113 may be formed integrally.

Figure 7:
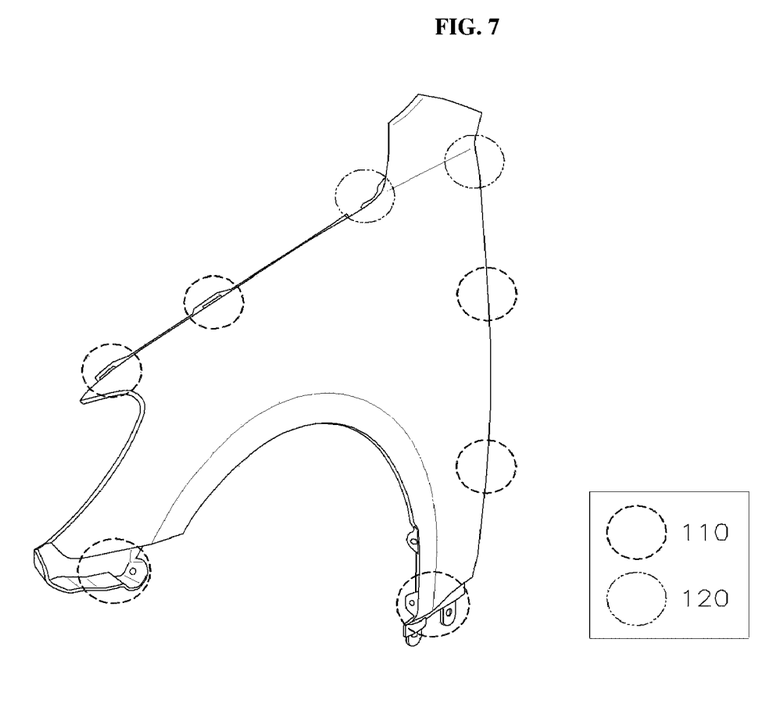
FIG. 7 is an exemplified view illustrating positions of one-piece fixtures at the plastic fender according to the exemplary embodiment of the present invention.
Figure 8:
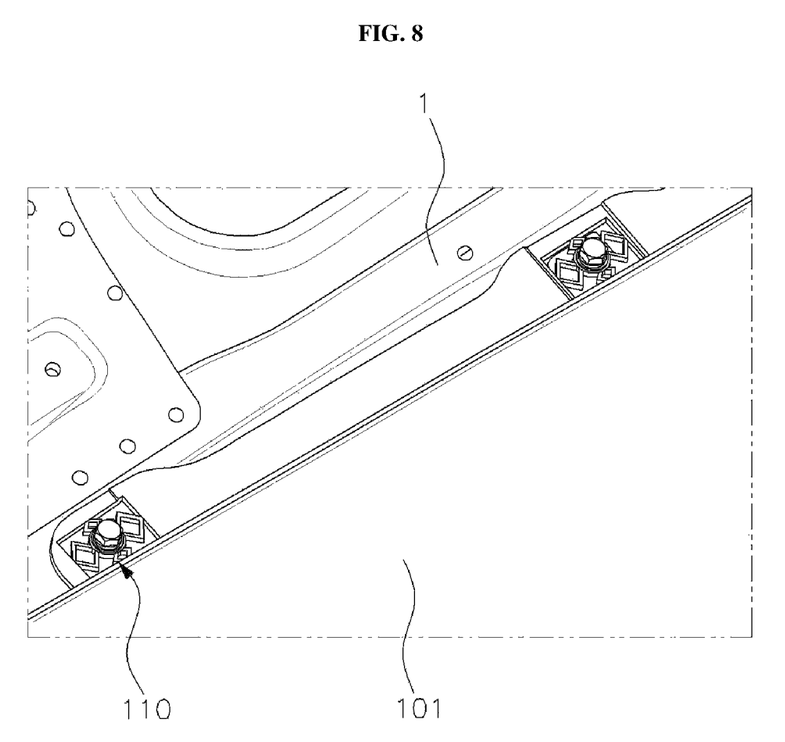
FIG. 8 is an exemplified view illustrating a state in which the one-piece fixture of the mounting portion of the plastic fender, a vehicle body, and a bolt according to the exemplary embodiment of the present invention are coupled.

FIG. 8 is an exemplified view illustrating a state in which the one-piece structure of the mounting portion of the plastic fender, the vehicle body, and the bolt according to the exemplary embodiment of the present invention are coupled. As shown in FIG. 8, the one-piece fixture 110 of the mounting portion of the plastic fender may be fastened to the vehicle body 1 made of a steel material by means of the bolt. FIG. 7 is an exemplified view illustrating positions of the one-piece fixtures 110 and positions of fixing portions 120 of the one-piece structure of the mounting portion of the plastic fender at the plastic fender according to the exemplary embodiment of the present invention.

The fixing portion 120 of the one-piece structure of the mounting portion of the plastic fender may be fastened to the position as illustrated in FIG. 7 by the bolt to fix the plastic fender 101. Thereafter, one or more one-piece fixtures 110 of the mounting portion of the plastic fender may be formed at portions which are substantially thermally deformed. As illustrated in FIG. 7, one or more one-piece fixture 110 of the mounting portion of the plastic fender may be formed at each of the hood line portion 21, the bumper line portion 23, and the door line portion 25 of the plastic fender 101.

Figure 9:
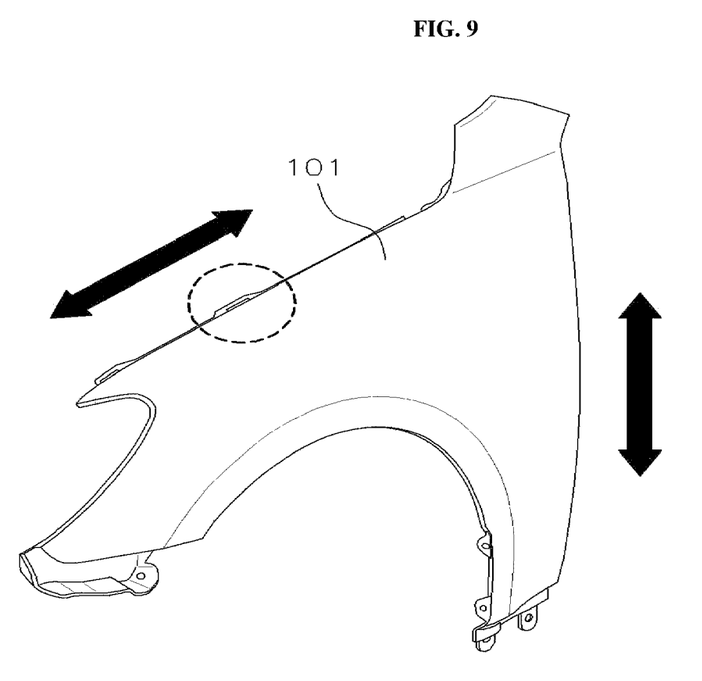
FIG. 9 is an exemplified view illustrating a movement of the plastic fender caused by thermal deformation according to the exemplary embodiment of the present invention.
Figure 10:
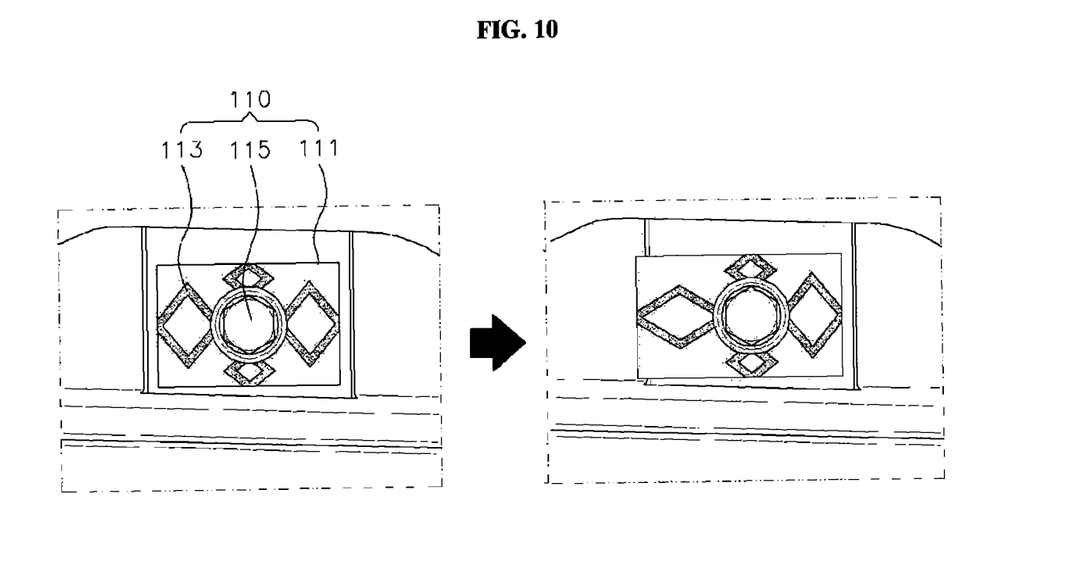
FIG. 10 is a configuration diagram illustrating a shape of the one-piece fixture which is deformed by thermal deformation of the plastic fender according to the exemplary embodiment of the present invention.

Hereinafter, a change of the bellows-shaped portion 113 when the plastic fender 101 is thermally deformed in the electrodeposition oven heat treatment step S15 will be described. When the one-piece fixture 110 of the mounting portion of the plastic fender and the fixing portion 120 are positioned as illustrated in FIG. 7, the plastic fender 101 may be thermally deformed in various directions during the heat treatment process. FIG. 9 is an exemplified view illustrating a movement of the plastic fender 101 caused by thermal deformation according to the exemplary embodiment of the present invention. In addition, FIG. 10 is a configuration diagram illustrating a shape of the one-piece fixture 110 which is deformed by thermal deformation of the plastic fender 101 according to the exemplary embodiment of the present invention.

As illustrated in FIG. 9, the plastic fender 101 may be moved by being thermally expanded by the heat treatment. However, the bolt and the fastening aperture fastened by the bolt may remain fixed. Therefore, a shape of the bellows-shaped portion 113 which connects the fastening aperture, to which the bolt 115 is fastened, and the plastic fender 101 may change based on thermal expansion of the plastic fender 101 as illustrated in FIG. 10. Thereafter, the bellows-shaped portion 113 may be restored back to an original shape by being cooled. As a result, it may be possible to prevent damage to the plastic fender and permanent deformation of the surface of the plastic fender.

The present invention is provided with constituent elements such as the bellows-shaped portion formed integrally with the plastic fender, and thus has advantages in that material costs may be reduced by omitting a separate mounting structure, that is, the sliding fixture, and process efficiency may be increased by omitting the step of assembling the sliding fixture. Furthermore, the present invention includes the bellows-shaped portion that may cope with thermal deformation in various directions, and as a result, it may be possible to prevent damage to the plastic fender and permanent deformation of the plastic fender.

While the present invention has been described above with reference to the specific exemplary embodiment of the present invention, the exemplary embodiment is merely an example, and the present invention is not limited to the exemplary embodiment. The described exemplary embodiment may be changed or modified by those skilled in the art to which the present invention pertains without departing from the scope of the present invention, and may be variously modified and changed within the technical spirit of the present invention and within the scope equivalent to the appended claims.

What is claimed is:

1. A plastic fender for a vehicle for coping with thermal deformation, comprising:
   a hood line portion;
   a bumper line portion;
   a door line portion; and
   a plurality of mounting portions formed along an edge of each of the hood line portion, the bumper line portion, and the door line portion, respectively,
   wherein the plastic fender includes a fixture formed on the mounting portion and moveable to cope with thermal deformation,
   the fixture includes a fastening aperture which is fastened to a vehicle body by a fastener,
   the fixture is formed integrally with the plastic fender, and
   the fastening aperture is positioned at a center of the fixture, and a bellows-shaped portion is formed to connect the mounting portions and the fastening aperture.

2. The plastic fender of claim 1, wherein the plastic fender is made of a thermoplastic resin.

3. The plastic fender of claim 1, wherein one or more fixtures are included in the mounting portions of the hood line portion, the bumper line portion, and the door line portion.

4. The plastic fender of claim 1, wherein the fastener is a bolt.

5. The plastic fender of claim 1, wherein the bellows-shaped portion has a rhombic shape.

* * * * *